C. R. ENGEL.
CRANKING DEVICE FOR GAS ENGINES.
APPLICATION FILED SEPT. 14, 1910.
992,864.
Patented May 23, 1911.
2 SHEETS—SHEET 2.
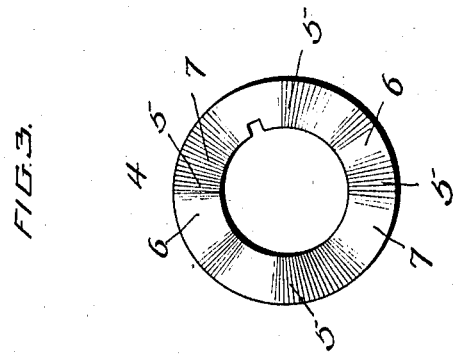
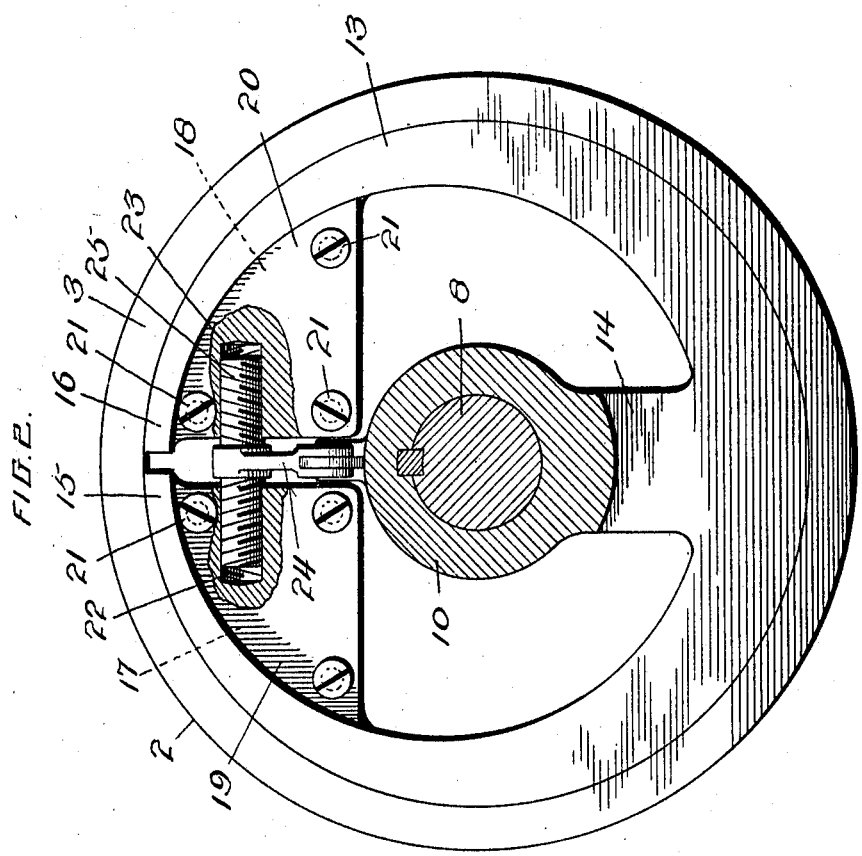
WITNESSES:
INVENTOR
Charles R. Engel.
BY
Attorneys

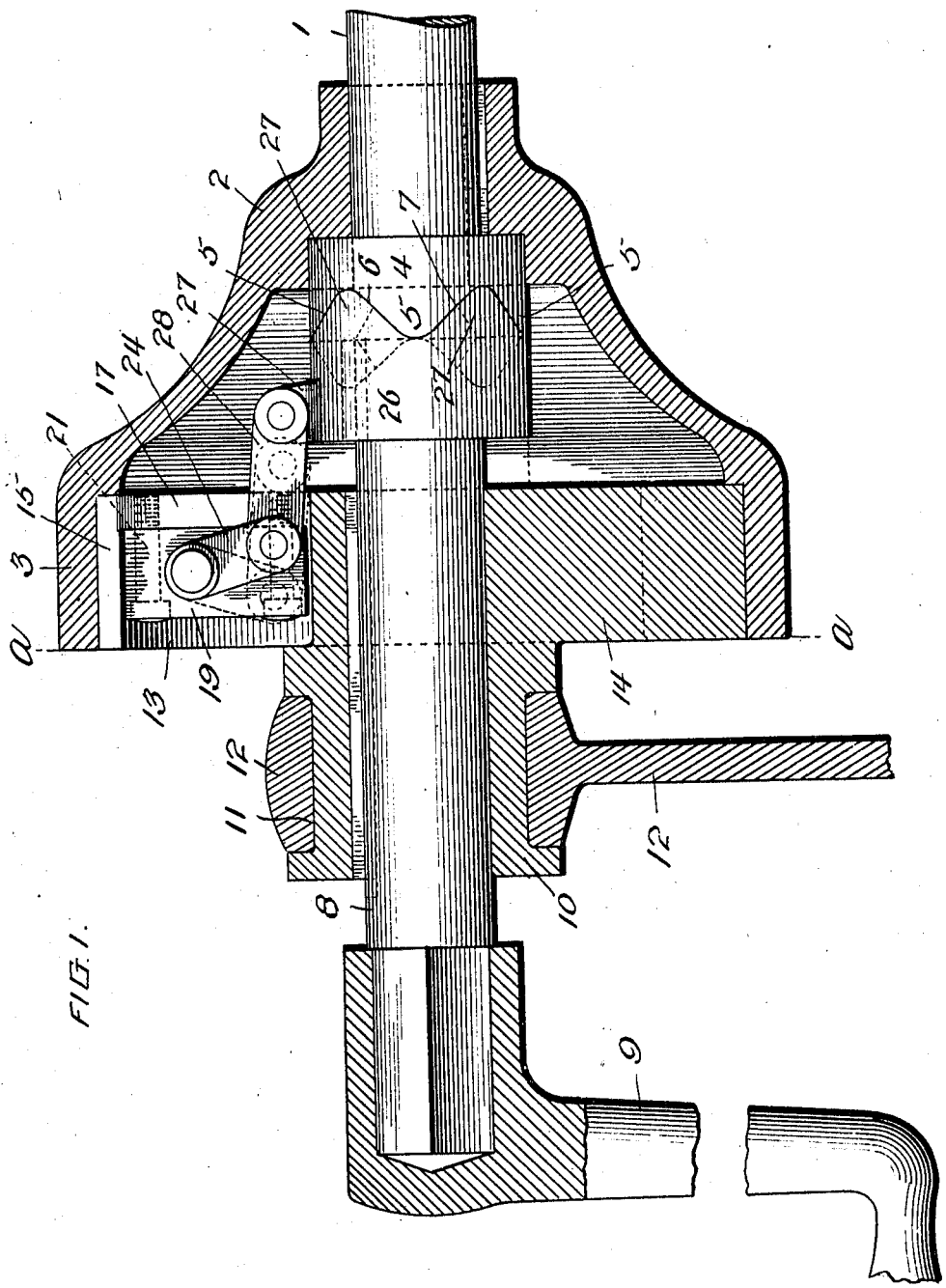

UNITED STATES PATENT OFFICE.

CHARLES R. ENGEL, OF OAKLYN, NEW JERSEY.

CRANKING DEVICE FOR GAS-ENGINES.

992,864. Specification of Letters Patent. Patented May 23, 1911.

Application filed September 14, 1910. Serial No. 582,100.

*To all whom it may concern:*

Be it known that I, CHARLES R. ENGEL, a citizen of the United States, residing at Oaklyn, in the county of Camden and State of New Jersey, have invented certain new and useful Improvements in Cranking Devices for Gas-Engines; and I do hereby declare the following to be a full, clear, and exact description of the invention, such as will enable others skilled in the art to which it appertains to make and use the same.

My invention relates to cranking devices for explosion engines for giving the engine shaft an initial rotation to draw a charge of the explosive mixture into the cylinder. In devices of this kind as commonly employed in connection with the explosion engines of automobiles there is danger to the person cranking the engine from back firing causing the crank to be rotated violently backward and it is also necessary to have the crank shaft and engine shaft disconnected instantly upon the starting of the engine.

My invention has for its object to provide a simple and effective device for connecting the crank shaft and engine shaft in which upon the starting of the engine in either direction the crank shaft will be automatically disconnected from the engine shaft so that there will be no throwing of the crank either by back firing or by the starting of the engine.

With this object in view my invention consists in the construction and combination of elements as hereinafter described.

Referring to the drawings: Figure 1 is a longitudinal sectional view of the complete device embodying my invention; Fig. 2 is a cross-sectional view on line *a—a* of Fig. 1; and Fig. 3 is a detail view of the ring carried by the engine shaft.

In the drawings, 1 is the engine shaft of an explosion engine. Fast on this shaft is a clutch member 2 having flange 3 the inner face of which is cylindrical. Within the clutch member 2 on the end of the engine shaft is a ring 4 fast on the shaft and extending into a counterbore formed in the hub of the clutch member. On this ring 4 are formed teeth 5 of the form shown in Fig. 1 that is curving from the crest of the tooth in both directions so as to form cam surfaces 6 and 7.

8 is the crank shaft having crank 9 at its outer end. To the crank shaft is splined a sleeve 10 having an annular groove 11 formed therein in which is received a bearing 12 which serves to support the sleeve and also to prevent it from moving longitudinally. On the inner end of the sleeve 10 is formed an expansible clutch member consisting of a ring 13 connected by arm 14 to the sleeve and cut in two at a point diametrically opposite the arm 14 the opening between the ends 15 and 16 being sufficiently great to permit the ring when the ends are drawn together to contract to a diameter less than that of the interior of the flange 3. The ends 15 and 16 are provided with inwardly extending flanges 17 and 18 to which are secured blocks 19 and 20 by means of screws 21 or otherwise and in these blocks are formed screw-threaded holes 22 and 23 the screw thread of 22 being a right hand thread and the screw-thread of 23 being a left hand thread. Between the blocks 19 and 20 a lever 24 extends carrying at its outer end a right and left screw rod 25 having on one side of the lever a right hand screw thread and on the other side of the lever a left hand screw thread the rod extending into the holes 22 and 23 and engaging the screw threads formed in them.

On the inner end of the crank shaft 8 is secured a sleeve 26 having on its inner end teeth 27 corresponding to and adapted to engage with teeth 5 on the ring 4. On the exterior of the sleeve 26 is a lug 27 to which is pivoted a link 28 the other end of which is pivoted to the inner end of the lever 24. Reciprocating movement of the sleeve 26 will, through the link 28, cause the lever 24 to swing in one direction or the other to rotate the rod 25 and cause the ends of the ring 13 to be forced apart or drawn together. The parts are so arranged that when the sleeve 26 is moved away from the ring 13 the right and left screw rod will expand the ends of the ring and when moved toward the ring the sleeve will cause the screw rod to draw the ends of the ring toward each other.

In operation, the crank shaft, being free to slide longitudinally through sleeve 10, is moved toward the engine shaft 1 until the teeth 27 of the sleeve 26 engage the teeth 5 on the ring 4. This movement of the sleeve 26 acting through the link 28 swings the lever 24 in a direction away from the crank end of the crank shaft and through the right and left screw rod 25 forces the ends of the clutch member 13 apart causing its outer surface to be firmly pressed against the inner surface of the flange 3, thus clutching the crank shaft to the engine shaft. On turning the crank the engine shaft will be rotated to start the engine. In case the engine back fires to cause the engine shaft to be rotated backward against the direction of rotation of the crank shaft, the cam surfaces 6 of the teeth 5 on ring 4 will act upon the corresponding surfaces of the teeth 27 of the sleeve 26 to force the sleeve away from the ring 4 and, through the link 28, lever 24 and right and left screw rod 25, will draw the ends of ring 13 toward each other and out of frictional contact with the inner surface of the flange 3, thus unclutching the crank shaft from the engine shaft. In the same way when the engine shaft starts into rapid rotation the cam surfaces 7 of the teeth 5 acting on the corresponding surfaces of the teeth 27 of the sleeve will release the clutch. The clutch will thus be released as soon as the engine shaft starts to rotate either backward or forward independently of the crank shaft, thus protecting the person operating the crank from possible injury.

While the device is particularly adapted and intended for use in connection with the engines of automobiles it may, obviously, be used for starting any explosion engine whether on an automobile or elsewhere.

Having thus described my invention, what I claim and desire to secure by Letters Patent is:

1. In a cranking device for explosion engines, the combination with an outer clutch member secured to the engine shaft, of a sleeve journaled in fixed bearings, a crank shaft longitudinally movable through the sleeve, an expansible clutch member carried by the sleeve, means operated by the longitudinal movement of the crank shaft for expanding and contracting the expansible member of the clutch.

2. In a cranking device for explosion engines, the combination with an outer clutch member secured to the engine shaft, of a sleeve journaled in fixed bearings, a crank shaft extending through the sleeve and connected therewith by a spline, an expansible clutch member carried by the sleeve, means operated by the longitudinal movement of the crank shaft, for expanding and contracting the expansible member of the clutch, and means carried by the engine shaft for moving the crank shaft in a direction to contract the expansible clutch member, whereby on rotation of the engine shaft independently of the crank shaft the clutch will be released.

3. In a cranking device for explosion engines, the combination with an outer clutch member secured to the engine shaft, a ring having cam teeth formed thereon fixed to the engine shaft within the clutch member, of a sleeve journaled in fixed bearings, a crank shaft extending through the sleeve and connected therewith by a spline, an expansible clutch member carried by the sleeve, a fixed sleeve on the end of the crank shaft having cam teeth on its end adapted to engage the teeth on the ring on the engine shaft, and means for expanding and contracting the expansible clutch member connected with the fixed sleeve on the crank shaft.

4. In a cranking device for explosion engines, the combination with an outer clutch member secured to the engine shaft, of a sleeve journaled in fixed bearings, a crank shaft extending through the sleeve and connected therewith by a spline, an expansible clutch member consisting of a ring open at one point to permit it to be expanded and contracted, a right and left screw engaging the separated ends of the ring, a lever secured to the right and left screw and means operated by the longitudinal movement of the crank shaft for swinging the lever.

In testimony whereof I affix my signature in presence of two witnesses.

CHARLES R. ENGEL.

Witnesses:
ADA ENGEL,
EDWARD J. MOSS, Jr.